United States Patent
Anderson et al.

(10) Patent No.: US 11,151,852 B2
(45) Date of Patent: Oct. 19, 2021

(54) FIREARM DISCHARGE DETECTION

(71) Applicant: AVIDEA Group, Inc., Melbourne, FL (US)

(72) Inventors: Ada Anderson, Palm Bay, FL (US); Michael Anderson, Melbourne, FL (US)

(*) Notice: Subject to any disclaimer, the term of this patent is extended or adjusted under 35 U.S.C. 154(b) by 0 days.

(21) Appl. No.: 16/410,740

(22) Filed: May 13, 2019

(65) Prior Publication Data

US 2019/0347920 A1 Nov. 14, 2019

Related U.S. Application Data (60) Provisional application No. 62/684,807, filed on Jun. 14, 2018, provisional application No. 62/670,768, filed on May 12, 2018.

(51) Int. Cl.
| | | |
|---|---|---|
| *G01S 3/808* | (2006.01) | |
| *G01S 5/20* | (2006.01) | |
| *G08B 17/08* | (2006.01) | |
| *G08B 21/18* | (2006.01) | |
| *G10L 25/51* | (2013.01) | |

(52) U.S. Cl.
CPC .......... *G08B 17/08* (2013.01); *G08B 21/182* (2013.01); *G10L 25/51* (2013.01)

(58) Field of Classification Search
CPC .......... G01S 5/22; G01S 19/18; G01S 3/8083; G01S 5/0252; Y10S 367/906; G01V 1/001; F41G 3/147; F41J 5/06; G10V 1/001

USPC .................. 367/125, 127, 129, 906
See application file for complete search history.

(56) References Cited

U.S. PATENT DOCUMENTS

| | | | |
|---|---|---|---|
| 5,455,868 A | 10/1995 | Sergent et al. | |
| 5,973,998 A | 10/1999 | Showen | |
| 6,185,153 B1 | 2/2001 | Hynes | |
| 7,266,045 B2 | 9/2007 | Baxter et al. | |
| 7,710,278 B2 | 5/2010 | Holmes | |
| 7,750,814 B2 | 7/2010 | Fisher | |
| 8,730,062 B2 | 5/2014 | Eldershaw | |
| 9,164,165 B2 | 10/2015 | Mattern | |
| 9,218,728 B2 | 12/2015 | Bickel | |
| 9,886,833 B2 | 2/2018 | Noland | |
| 10,061,013 B2 | 8/2018 | Hermann et al. | |
| 2002/0003470 A1 | 1/2002 | Auerbach | |
| 2006/0042142 A1 | 3/2006 | Sinha | |
| 2006/0161339 A1 | 7/2006 | Holmes | |
| 2008/0298176 A1* | 12/2008 | Fisher | G01S 5/22 367/127 |
| 2011/0170798 A1 | 7/2011 | Tidhar | |
| 2014/0361886 A1 | 12/2014 | Cowdry | |
| 2015/0070166 A1 | 3/2015 | Boyden | |
| 2016/0232774 A1* | 8/2016 | Noland | G08B 21/0438 |

* cited by examiner

*Primary Examiner* — George C Monikang
(74) *Attorney, Agent, or Firm* — Trueba & Suarez PLLC; Roberto M. Suarez; William R. Trueba, Jr.

(57) ABSTRACT

A firearm discharge detection method includes: programming a gunfire detector to report audio sensor data that comprises acoustic data falling outside of an expected sound level; receiving the audio sensor data; comparing the audio sensor data to stored gunshot signatures to identify possible gunfire; reporting the possible gunfire.

11 Claims, 6 Drawing Sheets

FIREARM DISCHARGE DETECTION

CROSS-REFERENCE TO RELATED APPLICATIONS

This application is a non-provisional of, and claims priority to, provisional patent application No. 62/684,807, filed on Jun. 14, 2018, entitled "Firearm Discharge Detection;" and provisional patent application No. 62/670,768, filed on May 12, 2018, entitled "Hub-Free Energy Management and Automation Solution;" both of which are incorporated herein in their entireties.

FIELD OF THE INVENTION

The invention disclosed broadly relates to the field of electrical and electronic devices and sensors, and more particularly relates to a firearm discharge detection solution that includes in situ detectors and cloud-based machine learning.

BACKGROUND OF THE INVENTION

Gunfire detection systems are no longer limited to military use. In the United States and in Europe, we are beginning to see widespread use of gunfire detection systems in hospitals, schools, government buildings, and sports complexes. As we see in some of these systems, it can take up to one minute or more between the time a shot is detected to when police are notified because human intervention is required to interpret the sensor output. When lives are in the balance, one minute is too long. To address this problem, newer systems have been developed that employ high-tech devices using auditory sensors coupled with processors to detect and identify gunfire. The drawback to these systems is that the deployed devices evaluate the sensor data at the site. This makes the devices costly and the computational burden is a power drain. Therefore, there is a need for a gunfire detection system that is both cost-efficient and accurate.

SUMMARY

In view of the foregoing, a preferred embodiment of the present invention is directed to a firearm discharge detector and system that is easy to use, affordable, and installs and sets up quickly. The system provides a host of unique features with the primary function of safety and security. Within the system, devices report detected firearm discharges in real-time. No hub is required; meaning one device can work by itself or as part of a multi-device system, thereby making the system easily scalable. Furthermore, each of the devices of the system can be configured to interface with third-party systems such as cameras, video cameras, fire sprinklers, alarms, and the like. Embodiments of the system are further configured to wirelessly interface with smart-speakers as is known in the art, thereby having the ability to be voice controlled via said smart-speakers. Yet further embodiments of the invention include devices that are able to communicate with and control third-party audio-visual systems.

In one embodiment, a method of firearm discharge detection includes: programming a gunfire detector to listen to its environment and report audio sensor data that comprises acoustic data falling outside of an expected sound level associated with the environment; receiving the audio sensor data from the gunfire detector; comparing the audio sensor data to stored gunshot signatures to identify possible gunfire; and reporting the possible gunfire.

Another embodiment is directed to a gunfire detection system including at least one gunfire detector in communication with a remote server. The gunfire detector includes a housing, an acoustic sensor, and an electronics and control module. The remote server is configured to receive the audio sensor data and compare it to stored gunshot signatures to identify possible gunfire. If the audio sensor data matches a stored gunshot signature, the remote server reports gunfire.

BRIEF DESCRIPTION OF THE SEVERAL VIEWS OF THE DRAWINGS

To describe the foregoing and other exemplary purposes, aspects, and advantages, we use the following detailed description of an exemplary embodiment of the disclosure with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present disclosure.

DESCRIPTION

In the Summary above, in the Description below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Firearm Discharge Detection System

We discuss a firearm discharge detection system that addresses the above-stated shortcomings of the known art. Referring now to the drawings in general and to FIG. 1 in particular, there is shown a simplified illustration of a firearm discharge detection system 100, according to an embodiment of the present disclosure. The system of FIG. 1, by example only, is shown implemented in a school with several classrooms 101.

Figure 1:
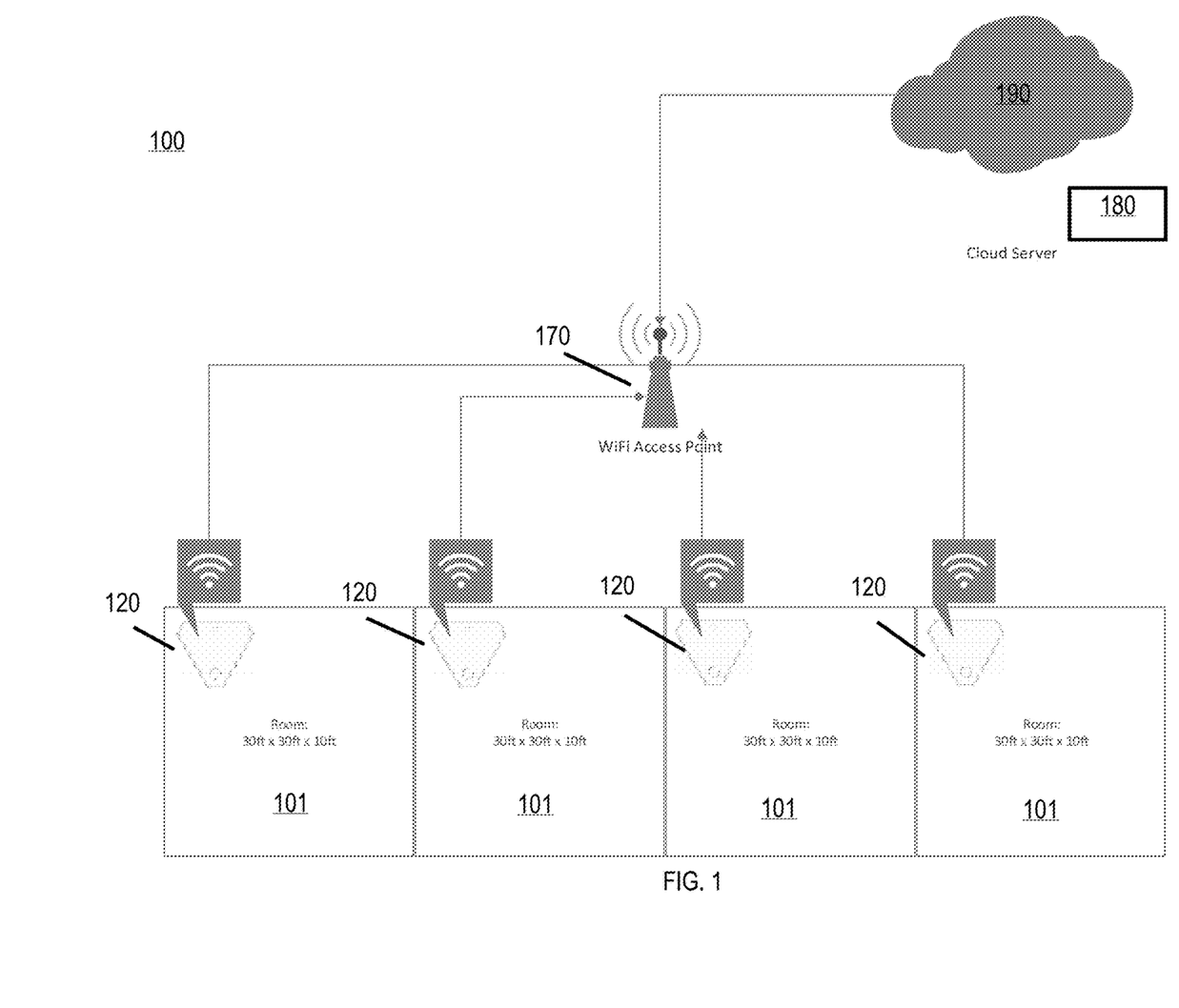
FIG. 1 shows an illustration of an exemplary block diagram for a firearm discharge detection system, according to an embodiment of the present disclosure.

Although the invention described herein contemplates many devices, the following types of devices are described by way of example and not limitation. In the example of FIG. 1, at least one firearm discharge detector 120 is deployed within each separate classroom 101 in the building. The system 100 functions best when two or more detectors 120 are distributed in one location. That way, the sensor data coming from each co-located detector 120 is compared at the server 190, thus providing more feedback for the learning algorithm and also providing a more accurate assessment of an on-going situation.

For use in schools, at least one detector 120 can be unobtrusively placed in each classroom 101 and several can be placed throughout hallways. The general size of the detector 120 is small, perhaps 2.5 inches in width, and 2.5 inches in height, making them portable and lightweight. Placement of the detectors 120 in a corner of the ceiling is ideal for maximum coverage; however, the detectors 120 can be located flat on a ceiling, wall, or doorframe. The higher in a room that the detector 120 is placed, the more coverage. In one embodiment, each detector 120 has a range of approximately 9,000 cubic feet, the size of a typical classroom in the United States.

Each of the firearm discharge detectors 120 are in wireless communication with a server 190 via an access point such as WiFi access point 170. The processing and any necessary calculations and computations to identify, confirm, and report a gunshot are performed at the server 190 rather than the detectors 120. This is a key feature of the system 100, wherein costs are kept low because the more expensive processing power of the server 190 is shared among multiple users, lowering their final cost. This lifts the computational burden from the remote detectors 120, thereby reducing the detectors' cost and extending their battery life.

In one embodiment, a data store 180 such as, for example, a look-up table contains a continually expanding catalog, or list, of gunshot "signatures" containing the acoustic signatures of known firearms and ammunition. The detector 120 communicates wirelessly with an external controller such as server 190 in order to report raw sensor data. The raw sensor data transmitted by the detector 120 is analyzed by the server 190 to determine if it matches a known gunshot signature from the data store 180. One with knowledge in the art will appreciate that the data store 180 can be located within the server 190 or it can be a separate component.

The external server 190 or controller may be a cloud server, local network server, smartphone, tablet, or other mobile device. By way of example, and not limitation, the server 190 is a computer system that is operatively coupled with a communications infrastructure. Some, or all, of the server functions may be implemented as computer program processes (software) that are tangibly stored in a memory that perform their respective functions when executed. Through network communications, as is commonly known in the art, the server 190 is operatively coupled to other components of the firearm discharge detection system 100 and future devices, features, and applications as may be developed over time. The server 190 enables the firearm discharge detection system 100 to be a centralized system that is 100% scalable, flexible, upgradable, and secure.

Firearm Discharge Detection Method

Figure 2:
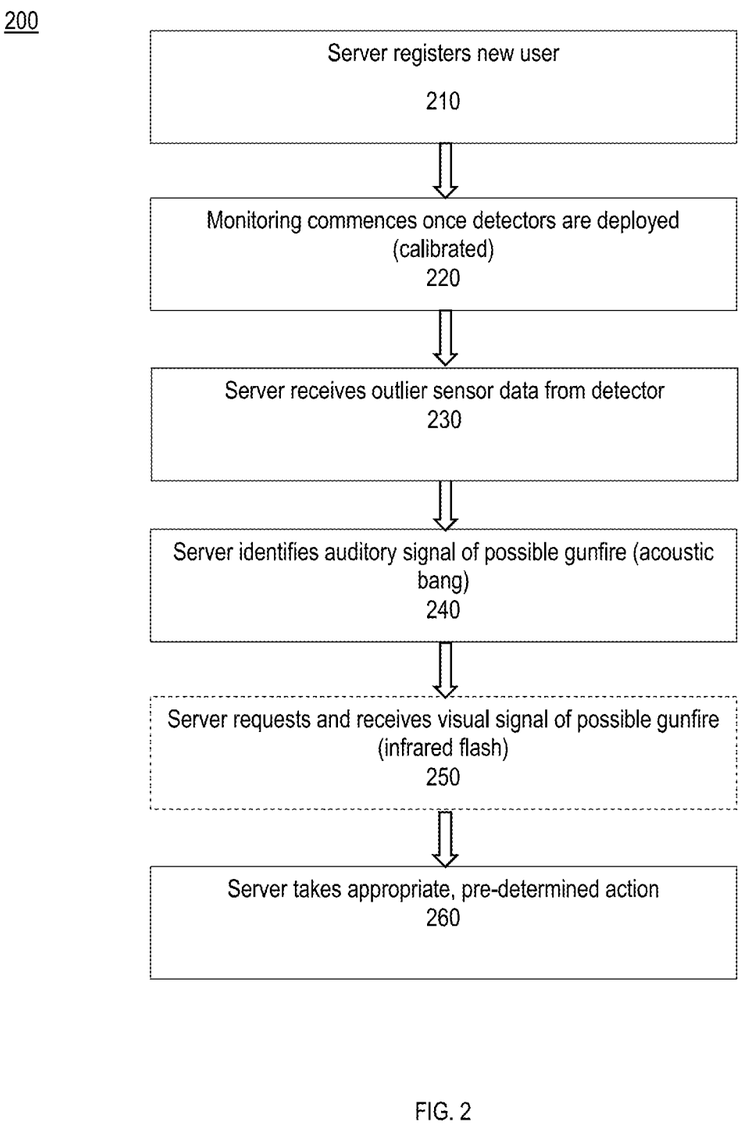
FIG. 2 is an operational flow diagram of a firearm discharge detection method, according to an embodiment of the present disclosure.

FIG. 2 is an operational flow diagram 200 of a firearm discharge detection method, according to an embodiment of the present disclosure. The method begins when a user of the system 100 initiates gunshot monitoring either through a Web-based browser registration process or via a mobile device application, in step 210. Next, the server 190 initiates monitoring after the firearm discharge detectors 120 are installed and the monitoring is activated in step 220. The detectors 120 are configured with communication capability allowing the detectors 120 to communicate with the server 190. The detectors 120 are easily installed by affixing them to a structure such as a wall, doorframe, or ceiling. The detectors 120 can be affixed by application of, for example, adhesive strips, screws, or magnets.

In one embodiment, the detectors 120 are trained during a calibration time window wherein the detectors 120 "learn" the typical noise levels of the environment monitored by the detectors 120. During this calibration time period, each deployed detector 120 device listens to monitor ambient noise levels, "learning" the typical noise levels at various times of the day. During the calibration period, the sensor data is used to build a profile of the typical expected noise levels for a given 24-hour period. Once the detector 120 has been calibrated, the detector 120 is operable to detect and report to the server 190 any transient noise outside of the typical noise level for processing. The detectors 120, once trained, report only sensor data that falls outside of the expected noise levels. In another embodiment, the detectors 120 are pre-programmed with a baseline decibel range and report any noise above that decibel range. No calibration time is required.

Once powered on, the detector 120 continuously "listens" to its environment. Basic programming in the detector 120 allows for it to ignore any noises below a pre-determined decibel range, or outside of its calibrated profile noise level. This is analogous to the basic programming used in glass-break alarms that allow them to ignore most sounds and respond only to sounds in a specific acoustical frequency.

In step 230, the server 190 receives the acoustic data from the detector 120. This acoustic data can be in the form of an audio recording. The audio recording includes the detected noise "outlier," i.e., a noise outside of the expected noise level. In step 240, the server 190 compares the acoustic data from the detector 120 to stored recordings of acoustic bangs within a pre-set decibel range of known gunfire. A match indicates that the acoustic data is likely to be an acoustic signature indicating gunfire.

In embodiments that include an infrared (IR) sensor such as a PIR sensor, in optional step 250 the server 190 can request and receive visual confirmation from the detectors 120. The visual confirmation can include a two-to-three second visual recording of the muzzle flash (infrared flash). An IR sensor can detect any spike in IR activity. This visual confirmation can be used to confirm that a gun was fired in those circumstances where the acoustic data from the detector 120 is not a good match with a stored audio recording of a gunshot. In step 260 the server 190 takes the appropriate, pre-determined action once a gunshot is confirmed.

The detector 120 is configured to receive and transmit signals, with a minimum processing power sufficient to detect a noise above a predefined decibel range; the detector 120 does not identify whether the signal is in fact a gunshot, nor does it identify the gunshot signature and report the gunshot. This processing is performed at the server 190. By transferring the computational burden to a system which presumably has greater computational power and is shared among many users of the system 100, we are able to address and virtually eliminate the reporting errors which plague current gunshot detection systems—both "false positive" errors in reporting a gunshot when no gunshot occurred, and "false negative" errors in not reporting an actual gunshot. This is because the server 190 is trained on a large amount of training data and the server's 190 greater computational power is able to fine-tune an analysis of a large amount of sensor data reported by the detectors 120.

In the server-side processing, the server 190 receives the audio signals transmitted by the detector 120 and tries to match the audio signals to a catalog of known gunshot signatures. If a match is found, the server 190 immediately takes the action listed in association with the signature. The action can be to notify the police, lock down the building, send a text alert, send an email alert, activate the fire sprinklers, and many more. In one embodiment, the action to take is provided by the user of the system 100. For example, assume ABC Corporation subscribes to the system 100 for gunshot monitoring. ABC Corporation accesses the server 190 either through a Web browser or mobile application, configuring the gunfire monitoring according to its needs, which may include providing emails and phone numbers of corporate officers to contact in the event a gunshot is detected within the office.

Firearm Discharge Detector

Figure 3:
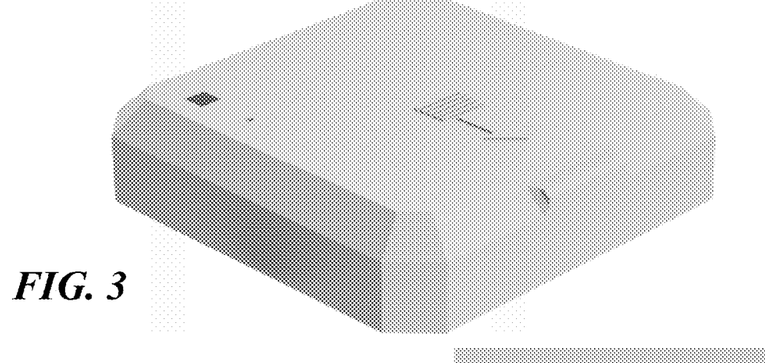
FIG. 3 shows an illustration of an exemplary detector device, according to an embodiment of the present disclosure.
Figure 5:
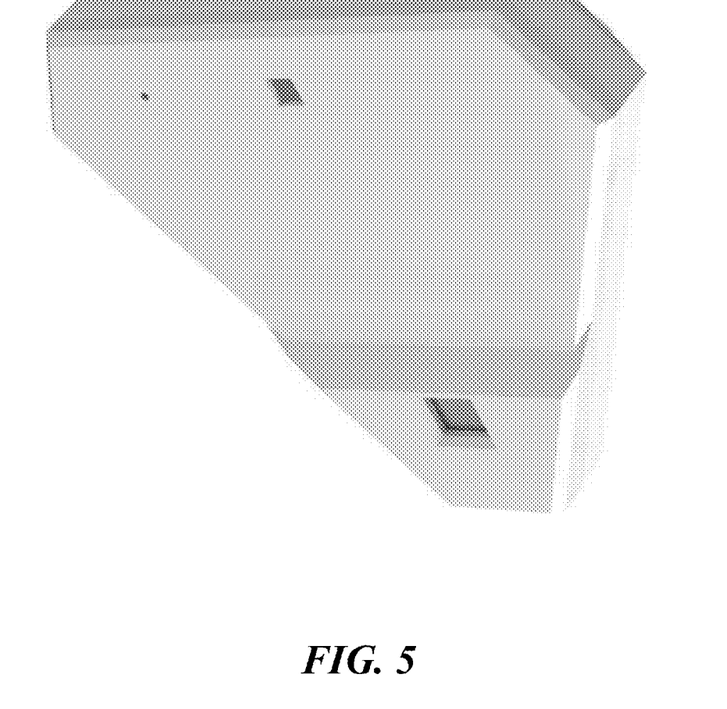
FIG. 5 shows an illustration of another exemplary detector device, according to an embodiment of the present disclosure.

Referring now to FIG. 3, there is shown an example of a detector 120. FIG. 5 shows another embodiment wherein the detector 120 has a "delta" shape. The detector's unique "delta" shape allows it to fit perfectly into the corner of a room. The detector 120 is operable to detect and record sounds. Optionally, the detector 120 can be configured with processing to distinguish a gunshot from another loud noise, such as a car backfire. The detector 120 can also record a spike in IR activity which could indicate a muzzle flash as added confirmation that a shot was fired and also from where it was fired.

Figure 7:
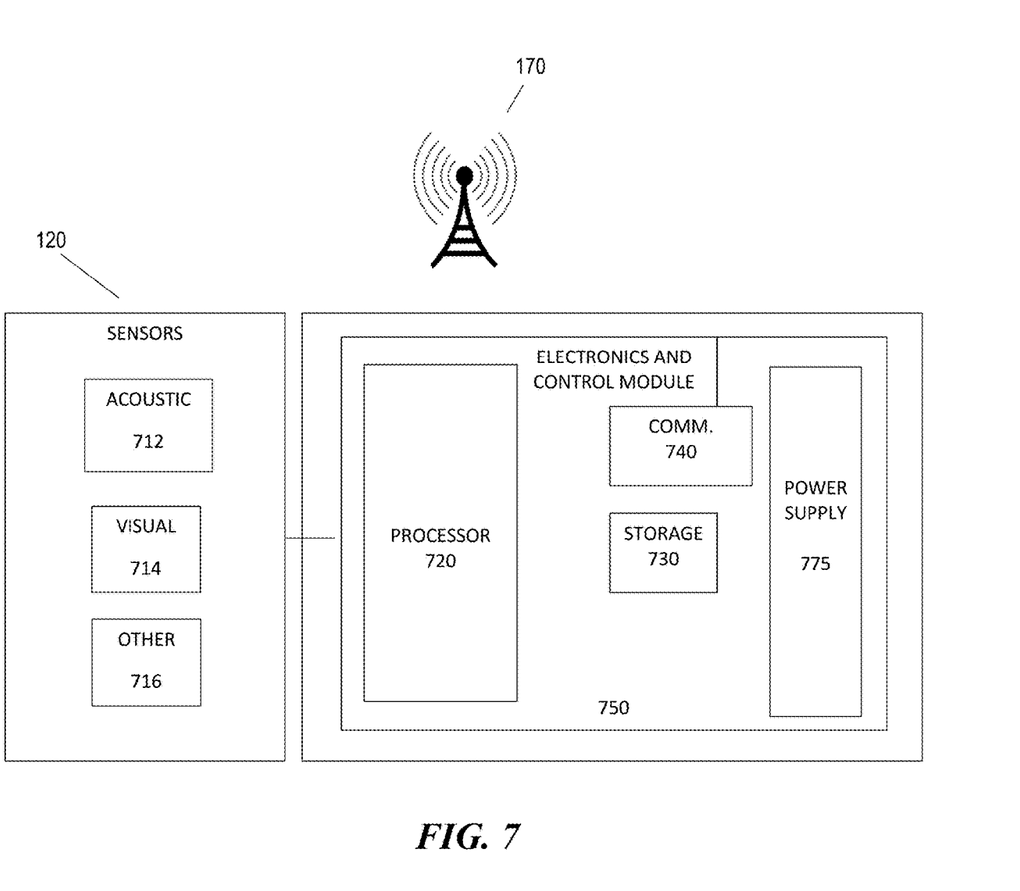
FIG. 7 shows a simplified block illustration of the components of an exemplary detector device, according to an embodiment of the present disclosure.

Referring to FIG. 7, there is shown a simplified block illustration of the components of an exemplary detector 120, according to an embodiment of the present disclosure. The detector 120 includes a housing, sensors, circuitry and a power connection. Embodiments of the detector 120 are configured to accept power via a conventional "hard-wire" power source. Other embodiments may be powered by a specially configured battery pack. The detector's 120 sensors 710 are in operative communication with an electronics and control module 750, which in turn communicates with the server 190.

When a gun is discharged, it produces two telltale effects: a visual effect, and an auditory effect. The muzzle flash is the visual effect; it is the light seen when a gun is fired. The light is made up of high-temperature gases expelled from the muzzle of a gun when fired. The acoustic event of a gunshot has two components: the muzzle blast (the loud bang) and the shock wave (the crack of the bullet through the air). In order to detect both telltale effects of a gunshot, the flash and the sound, the detector 120 in one embodiment includes bi-modal sensors 710. An acoustic sensor 712 such as an audio microphone detects the noise from a gun blast (acoustic bang); and an optical sensor 714 detects the muzzle flash (infrared) from a firearm. CMOS Image Sensors and CMOS-SPADs (Single Photon Avalanche Diodes) are examples of optical sensors used to detect muzzle flashes. These are disclosed in US PUB 2014/0312209 A1 "Muzzle flash detection." Another type of sensor is a PIR (passive infrared) sensor, also known as a pyroelectric sensor. The PIR is an electronic sensor measuring infrared light emitted from objects in its field of view, commonly used in motion detectors.

The circuitry and hardware of the sensor component 710 is configured to sense that a noise above a pre-configured "normal" noise has occurred in the vicinity of the detector 120 and transmits the audio signals to the server 190 to perform a pre-defined action in response. The sensors 710 are integral to the device 120 and are communicatively coupled with the electronics and control module 750. The sensor component 710 can include additional sensors 716 such as, for example, occupancy sensors, azimuthal sensors, proximity sensors, smoke detectors, global positioning system (GPS) sensors, and accelerometers, to name a few. The additional sensors can assist the server 190 in pinpointing the exact location and position of the shooter. As an example, when shots are detected, a camera is turned on, revealing the shooter.

The electronics and control module 750 includes: a processor 720, a communications subsystem 740, storage 730, and a power supply 775. The communications subsystem 740 can include, for example, a network interface for enabling communication with the server 190. Processor 720 may be embodied, for example, as a single microprocessor, a series of microprocessors, or a Field-Programmable Gate Array (FPGA). The processor 720 has communications capability in order to communicate with the server 190 to transmit the detector's 120 identification, its location, and sensor data, including position information.

Storage 730 may be embodied, for example, as memory. The memory may be partitioned or otherwise mapped to reflect the boundaries of the various memory subcomponents. Memory may include both volatile and persistent memory for the storage of: operational instructions for execution by CPU, data registers, application storage and the like. Memory can include a combination of random access memory (RAM), read only memory (ROM) and persistent memory such as that provided by a hard disk drive in secondary memory. The computer instructions/applications that are stored in memory are executed by the processor 720.

Figure 4:
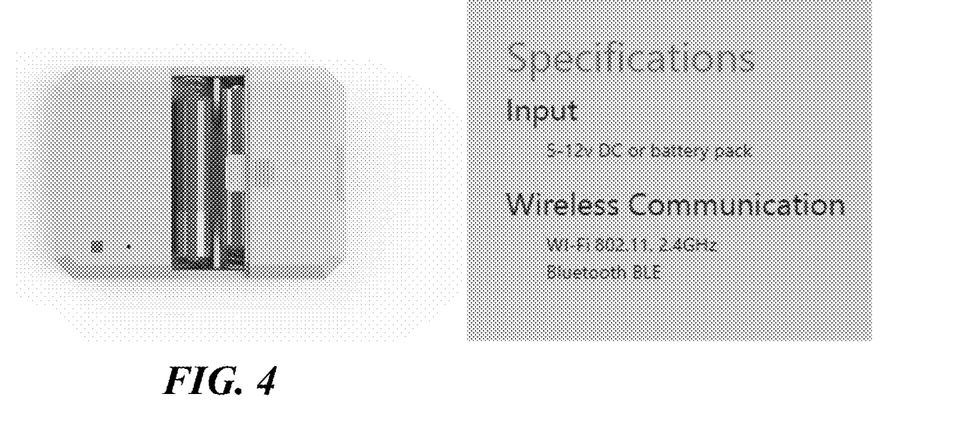
FIG. 4 shows an illustration of an exemplary detector device with the battery cover open, according to an embodiment of the present disclosure.

The power-management system includes a power supply 775. The power supply 775 can be implemented, for example, as standard alkaline batteries as shown in FIG. 4, or a rechargeable battery pack, such as a lithium-ion battery pack. The sensors 710 may also be hard-wired to directly receive power from a power source.

Figure 6:
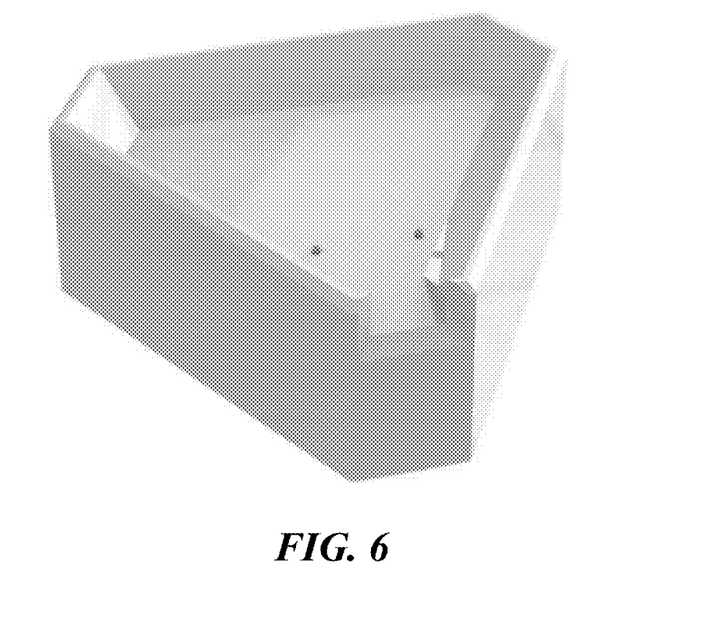
FIG. 6 shows an exemplary battery pack for a detector device, according to an embodiment of the present disclosure.

Mounting of the detector device 120 into a corner is accomplished through a special-purpose bracket, an embodiment of which is illustrated in FIG. 6. FIG. 6 illustrates a triangular bracket, having a mounting hole for a screw or similar fastener, and made of a ferrous metal. The corner bracket can be attached to a corner such that a magnet or device containing a magnet (such as the Detector described herein) may be affixed to it.

Embodiments of the invention further contemplate logic and sensor subsystems operably coupled to the detector 120 so that a user may operate the detector 120 through a specially programmed wireless communication device enabled with a user interface and communicatively coupled via a communications network.

A system, incorporating one or more of the device embodiments described above, is contemplated to be within the scope of the present invention disclosure. A preferred system embodiment of the present invention includes a system of one or more detectors 120, connected over a network to other devices and where the one or more devices exchange reports, outputs, and inputs with a remote server 190. For example, a system embodiment may include smoke alarms, occupancy sensors, cameras, third party system interfaces, smart phone apps and a browser-based management dashboard. The system is configured so that the various elements of the system communicate via wireless communication protocols (such as, but not limited to, Wi-Fi or Bluetooth) in order to detect and report a firearm discharge.

Machine Learning

In order for the server 190 to be able to correctly identify that the audio recording it receives is a gunshot, the server 190 must match the recording to a recording of a known gunshot. Because of numerous parameters such as ambient noise, distance, use of suppressors, caliber, etc. that affect the sound of the gunshot, it is not always possible to make an exact match. For this reason, the server 190 is trained on a large number of audio recordings of gunshots. A sufficiently designed and trained machine learning model is configured to determine the difference between, for example, a car backfire and a gunshot. The model is trained through numerous iterations over training data including audio recordings of different types of gunshots with variations in ambient noise. In order to mimic real-life situations and to train the model to distinguish gunfire when ambient noise is present, the training data recordings will include different types and levels of ambient noise. The training output is compared against the known output. We strive for a training error of zero; however, embodiments can function quite well with a training error within an acceptable threshold. Errors (incorrect identifications) get propagated back for further processing.

Figure 8:
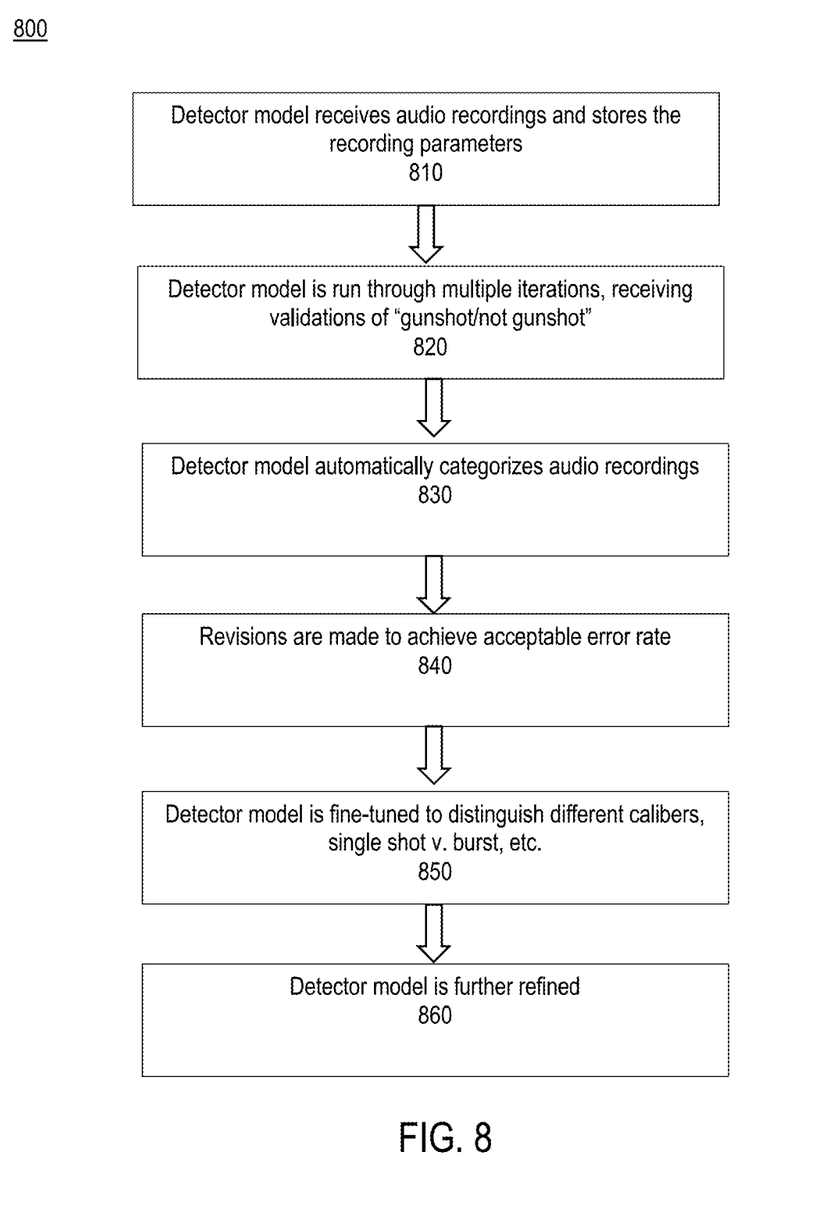
FIG. 8 is an operational flow diagram of an exemplary machine learning method for training a firearm discharge model, according to an embodiment of the present disclosure.

Referring now to FIG. 8, we discuss an operational flow diagram 800 of the machine learning process for training a gunshot detector model. Initially, in step 810 the machine learning process requires human intervention until the model is sufficiently trained. For example, the model is fed the recorded audio data, along with an identification for each item, such as "gunshot" or "not gunshot." The model stores the parameters associated with each recording, such as, by way of example and not limitation, frequency, decibel level and elapsed time.

In step 820, with each validation of "gunshot" or "not gunshot" the model "learns" to distinguish between the sound of a gunshot and other noises, such as a car backfire. After the model is sufficiently trained, we provide a large number of audio files to process automatically, without human intervention, in step 830. The results are evaluated, comparing the training output with the desired output. Revisions are made to reduce the error rate to an acceptable level, and the training process continues in step 840. In one embodiment, the model is trained to identify a likelihood that a noise is a gunshot, with any likelihood over 75% considered as positive for a gunshot. Given one or more audio files with meta data such as the reading of the PIR sensor, and the timestamp of the recording, the model can return a percentage likelihood that the audio recording is in fact a gunshot, and the percent likelihood of a particular caliber.

In addition to training the model to make a "gunshot/not gunshot" identification; the model can be fine-tuned to identify characteristics such as caliber, rate of fire, etc. in step 850. By listening to the frequency, reverberation, and duration of a gunshot (often combined into a term called the "report"), characteristics such as caliber can be determined. In this same way one could determine a suppressed firearm as well by listening for the specific noises of the gas expanding at an altered rate combined with the mechanical movement in the firearm. Once the model has reached a desirable accuracy, i.e., an acceptable error rate, it can be deployed and further refined as it is used to evaluate live recordings from deployed detectors 120 in step 860.

Monetization

Embodiments of the system 100 as described are ideal for use in schools, office buildings, hospitals, government offices, and just about anywhere where public safety is a concern. The low-cost of the detectors 120 means that the system 100 is affordable to implement and easy to scale up simply by installing additional detectors 120. By way of example only and not limitation, use of the system 100 for gunfire monitoring can be purchased on a subscription basis, similar to conventional burglar systems. A user can be charged a flat monthly rate for gunfire monitoring. The monthly rate can include a fixed amount of user-installed detectors 120.

Secure Architecture

Network security is a concern, especially as more and more devices are connected to the Internet. The preferred embodiment of the invention has security protocols built-in. Every device that is part of the invention is configured to perform a self-exam spaced by configurable time intervals. The device is configured to perform a comparison between current parameters and pre-defined acceptable parameters and, if anything is amiss, the device will report the issues and take corrective actions including removing any local malware.

World-Wide Control

Embodiments of the invention include devices configured with network communication hardware and protocols as described above. The devices may thusly be configured to communicate wirelessly, through the internet, to a secure server maintained in a location remote to the device. Through a specially configured computing device, a user may remotely access and interact with one or more of their system devices, from anywhere in the world through the secure server. In this way, a user may operate and monitor a device or an entire system from anywhere in the world.

Computer System

Throughout the description herein, various embodiments of the invention are disclosed as having processors, processing means, or other forms of computational means that, for the purposes of this invention, shall be interchangeably considered a special purpose "computer system." For purposes of this invention, computer system may represent any type of computer, information processing system or other programmable electronic device, including a client computer, a server computer, a portable computer, an embedded controller, a smartphone, a tablet computer, a personal digital assistant, a Cloud computing device, and so on. The computer system may be a stand-alone device or networked into a larger system. The computer system, illustrated for exemplary purposes as a mobile computing device, is in communication with other networked computing devices. As will be appreciated by those of ordinary skill in the art, a network may be embodied using conventional networking technologies and may include one or more of the following: local area networks, wide area networks, intranets, public Internet and the like.

Throughout the description herein, an embodiment of the invention is illustrated with aspects of the invention embodied solely on a specially programmed computer system. As will be appreciated by those of ordinary skill in the art, aspects of the invention may be distributed amongst one or more specially programmed computing devices, which interact with the computer system via one or more data networks such as, for example, the Internet. However, for ease of understanding, aspects of the invention have been embodied in a single computing device.

A specially programmed (or special purpose) computer system includes inter alia processing device, which communicates with an input/output subsystem, memory, and storage. The processor device is operably coupled with a communication infrastructure (e.g., a communications bus, cross-over bar, or network). The processor device may be a special purpose microprocessor, or a general purpose processor specifically configured for operating under control of computer program instructions executed from memory on program data, thereby becoming a specially programmed processor. The processor may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own special purpose processor for executing instructions. Alternatively, some or all of the sub-processors may be implemented in an ASIC. RAM may be embodied in one or more memory chips.

The memory may be partitioned or otherwise mapped to reflect the boundaries of the various memory subcomponents. Memory may include both volatile and persistent memory for the storage of: operational instructions for execution by CPU, data registers, application storage and the like. Memory can include a combination of random access memory (RAM), read only memory (ROM) and persistent memory such as that provided by a hard disk drive in secondary memory. The computer instructions/applications that are stored in memory are executed by processor. The computer instructions/applications and program data can also be stored in hard disk drive for execution by processor device.

Certain features described herein may be implemented in many ways known by one skilled in the art. For example, certain features may be implemented as "logic" or a "unit" that performs one or more functions. This logic or unit may include hardware, such as one or more microprocessors, application specific integrated circuits, or field programmable gate arrays, software, or a combination of hardware and software.

Further, in view of many embodiments to which the principles of the invention may be applied, it should be understood that the illustrated embodiments are exemplary embodiments and should not limit the present disclosure. Features and components from one embodiment can be used with other embodiments.

Therefore, while there has been described what is presently considered to be the preferred embodiment, it will be understood by those skilled in the art that other modifications can be made within the spirit of the disclosure. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. A component from one embodiment can be used with another embodiment. It should be understood that the invention is not limited to the embodiment(s) described above, but rather should be interpreted within the full meaning and scope of the disclosure.

The invention claimed is:

1. A method of providing a gunshot monitoring service utilizing a system of a one or more in-situ detector and a cloud-based server adapted for machine learning, the method comprising:
    providing the cloud-based server adapted for machine learning, said cloud-based server adapted for machine learning having been deployed upon reaching a defined error rate through the steps of:
        receiving audio recordings and storing the recording parameters;
        running through multiple iterations and receiving validations of gunshot or not gunshot;
        categorizing audio recordings; and
        revising in order to achieve the defined error rate;
    installing of the one or more in-situ detector in a corresponding one or more location to be monitored, each of the one or more in-situ detector configured with communication capability allowing each of the one or more in-situ detector to communicate with the cloud-based server adapted for machine learning and programmed to listen to the corresponding one or more location to be monitored and report audio sensor data, each of the one or more in-situ detector further configured such that they are either pre-programmed with a baseline decibel range reporting threshold, or trained during a calibration time window wherein each of the one or more in-situ detector learns typical expected noise levels of the corresponding one or more location to be monitored and builds a profile of the typical expected noise levels for a given 24-hour day such that, upon calibration, each of the one or more in-situ detector is operable to detect and report to the cloud-based server adapted for machine learning only the audio sensor data that falls outside of the typical expected noise levels compared to the profile;
    initiating of the gunshot monitoring service by a user of the system through a Web-based browser registration process or via a mobile application;
    initiating monitoring by the cloud-based server adapted for machine learning after installation of the one or more in-situ detector and the initiating of the gunshot monitoring service;
    powering on each of the one or more in-situ detector;
    listening continuously by each of the one or more in-situ detector to the corresponding one or more location to be monitored;

reporting by the one or more in-situ detector of the audio sensor data detected at the corresponding one or more location to be monitored to the cloud based server adapted for machine learning; and at the cloud-based server adapted for machine learning:
receiving from the one or more in-situ detector of the audio sensor data detected at the corresponding one or more location to be monitored;
comparing the audio sensor data received to stored gunshot signatures to identify possible gunfire at the corresponding one or more location; and
based upon confirmation of a match with a stored gunshot signature, taking by the cloud-based server the action configured in association with the stored gunshot signature, whereby, the method provides for the gunshot monitoring service utilizing a system of a one or more in-situ detector and a cloud-based server adapted for machine learning to monitor, detect, and act on audio sensor data related to a gunfire discharge.

2. The method of claim 1, wherein the one or more in-situ detector further comprises one or more bi-modal sensor adapted to detect a muzzle flash as well as the audio sensor data, the method further comprising:
receiving visual data from the bi-modal sensor, the visual data comprising a spike in infrared activity from the in-situ detector; and
using by the cloud-based server adapted for machine learning the visual data as confirmation of a gunshot at the corresponding one or more location to be monitored.

3. The method of claim 2 wherein the cloud-based server adapted for machine learning only requests the visual data received from the bi-modal sensor when the audio sensor data is not a match with the stored gunshot signature.

4. The method of claim 1 wherein the cloud-based server adapted for machine learning having been deployed upon reaching a defined error rate through the further step of fine-tuning the machine learning to identify any one or more of caliber, rate of fire, or suppression.

5. The method of claim 1 further comprising comparing by the cloud-based server adapted for machine learning of the sensor data received from multiple one or more in-situ detector to pinpoint a location and a position of a shooter.

6. A gunfire detection system comprising:
at least one gunfire detector programmed to listen to its environment and report to a remote server audio sensor data comprising acoustic data falling outside of an expected sound level associated with the environment, the at least one gunfire detector comprising:
a housing;
an acoustic sensor; and
an electronics and control module operatively coupled with the acoustic sensor, the electronics and control module comprising:
a processor device;
a communications module facilitating wireless communication with the remote sensor;
a storage comprising an operational instruction set to be executed by the processor device, the operational instruction set configured such that each of the at least one gunfire detector are either pre-programmed with a baseline decibel range reporting threshold, or trained during a calibration time window wherein each of the at least one gunfire detector learns typical expected noise levels of its environment and builds a profile of the typical expected noise level for a given 24-hour day such that, upon calibration, each of the at least one gunfire detector is operable to detect and report to the remote server only the audio sensor data that falls outside of the typical expected noise level compared to the built profile; and
a power supply; and
the remote server adapted for machine learning having been deployed upon reaching a defined error rate through the steps of:
receiving audio recordings and storing the recording parameters;
running through multiple iterations and receiving validations of gunshot or not gunshot;
categorizing audio recordings; and
revising in order to achieve the defined error rate; and
further performing:
receiving the audio sensor data from the at least one gunfire detector installed in a first location;
comparing the audio sensor data to stored gunshot signatures to identify possible gunfire at the first location; and
based upon confirmation of a match with a stored gunshot signature, reporting the possible gunfire.

7. The gunfire detection system of claim 6 wherein the housing has a delta shape facilitating attachment to a corner.

8. The gunfire detection system of claim 6 wherein the at least one gunfire detector further comprises an optical sensor detecting a muzzle flash and the muzzle flash is reported to the remote server whereupon the muzzle flash is used as visual confirmation of a gunshot.

9. The gunfire detection system of claim 6 wherein the at least one gunfire detector further comprises at least one sensor selected from a group consisting of: an occupancy sensor, an azimuthal sensor, a proximity sensor, a smoke detector, and a global positioning system (GPS) sensor.

10. The gunfire detection system of claim 6 wherein the at least one gunfire detector is connected over a network to multiple devices to exchange reports, inputs, and outputs with the remote server.

11. The gunfire detection system of claim 6 wherein the remote server compares sensor data from at least two gunfire detectors to pinpoint a location and position of a shooter.

* * * * *